United States Patent [19]

Asaka et al.

[11] 4,144,850  
[45] Mar. 20, 1979

[54] AUXILIARY INTAKE PASSAGE FOR INTERNAL COMBUSTION ENGINES

[75] Inventors: Urataro Asaka, Kamifukuoka; Hitoshi Ohara, Tokyo, both of Japan

[73] Assignee: Honda Giken Kogyo Kabushiki Kaisha, Tokyo, Japan

[21] Appl. No.: 760,528

[22] Filed: Jan. 19, 1977

[30] Foreign Application Priority Data

Jan. 28, 1976 [JP] Japan .................................. 51/7464

[51] Int. Cl.² ............................................ F02B 75/18
[52] U.S. Cl. ............................ 123/52 M; 123/32 SP; 123/32 ST; 123/75 B; 123/191 S
[58] Field of Search ............ 123/32 SP, 32 ST, 52 M, 123/75 B, 191 S, 122 AB

[56] References Cited

U.S. PATENT DOCUMENTS

| | | | |
|---|---|---|---|
| 1,305,174 | 5/1919 | Smith | 123/52 M |
| 1,360,098 | 11/1920 | Deppé | 123/52 M |
| 1,402,886 | 1/1922 | Peterson | 123/52 M |
| 2,066,922 | 1/1937 | Wolfard | 123/52 M |
| 3,878,826 | 4/1975 | Date | 123/75 B |
| 3,890,942 | 6/1975 | Date et al. | 123/122 AB X |
| 3,892,212 | 7/1975 | Tamai et al. | 123/122 AB |
| 3,916,847 | 11/1975 | Nakano et al. | 123/122 AB X |
| 3,916,852 | 11/1975 | Sakurai et al. | 123/122 AB X |
| 3,916,858 | 11/1975 | Taguchi et al. | 123/122 AB |
| 3,964,460 | 6/1976 | Nakano | 123/32 ST |
| 3,994,271 | 11/1976 | Ishizuya | 123/52 M |
| 4,016,846 | 4/1977 | Nakano | 123/75 B |
| 4,029,066 | 6/1977 | Iwasa | 123/75 B X |

*Primary Examiner*—Charles J. Myhre  
*Assistant Examiner*—Jeffrey L. Yates  
*Attorney, Agent, or Firm*—Lyon & Lyon

[57] ABSTRACT

An auxiliary intake passage system for internal combustion engines having a main carburetor delivering a lean mixture to main combustion chambers through a main intake passage, and an auxiliary carburetor delivering a rich mixture to auxiliary combustion chamber through an auxiliary intake passage. The auxiliary intake passage system is comprised of an induction passage leading from the auxiliary carburetor to an auxiliary intake distribution chamber. A plurality of branch passages extend laterally from said auxiliary intake distribution chamber and lead to the auxiliary combustion chambers. The induction passage comprises a first portion of substantially uniform cross-sectional area connected to a second portion which is tapered and so formed that the internal wall of the tapered section is outside the axial projection of the internal wall of the first portion, thus minimizing resistance to fluid flow and improving fuel distribution and homogenation to each combustion chamber.

6 Claims, 5 Drawing Figures

AUXILIARY INTAKE PASSAGE FOR INTERNAL COMBUSTION ENGINES

The present invention relates to auxiliary intake passage systems used in internal combustion engines and particularly those of the stratified charge type.

Internal combustion engines have been developed which include a main carburetor and n auxiliary carburetor leading to main and auxiliary intake passages. The former provides a lean mixture to main combustion chambers in the engine while the latter provides a rich mixture to auxiliary combustion chambers. The rich mixture is delivered to the auxiliary combustion chambers through branch passages leading from a distribution chamber within said auxiliary intake passage. After the compression stroke, a spark plug ignites the rich mixture in the auxiliary combustion chamber and causes a torch flame to project into the main combustion chamber to ignite the lean mixture contained therein. In this way, the amount of unwanted emissions in the exhaust gases discharged into the atmosphere is reduced.

Prior systems have been developed which include an auxiliary carburetor of down draft type particularly associated with an auxiliary intake passage having an auxiliary intake distribution chamber with its bottom wall forming a heating surface. In these systems, an induction passage connects the carburetor to the distribution chamber which in turn communicates with auxiliary combustion chambers by means of branch passages.

In such prior systems, however, the induction passages have generally included a straight pipe having substantially constant cross-sectional area. Although such prior systems adequately introduce the mixture to the center of the heating surface, and adequately heat the mixture and improve its quality by causing the mxiture to travel substantial distance while being heated, nevertheless there exists the disadvantage that a continuous flow of rich mixture is impeded since atomized fuel particles are likely to adhere to the passage walls, thereby increasing the mixture flow resistance and the amount of fuel running down the walls, contributing to uneven air-fuel concentrations.

It is therefore an object of this invention to provide a system which is free of the above disadvantages. Thus, in accordance with the disclosed invention, the induction passage which allows communication between the auxiliary carburetor passage and the auxiliary intake distribution chamber is comprised of a first portion of substantially uniform cross-sectional area connected in a stepped fashion to a tapered portion on the downstream side thereof. Said tapered section is formed so that its internal wall is outside the axial projection of the internal wall of said first portion. The tapered section is shaped so that its cross-sectional area increases by at least approximately 5 square millimeters for each 1 millimeter increase in axial length.

By virtue of this configuration, the tapered section effectively reduces resistance to fluid flow, and also provides the advantage that relatively large particles of fuel in the mixture contact the heating surface directly at the bottom wall of the distrubition chamber; while relatively small particles are carried in a diffused state by the flow of mixture to the combustion chambers with very few particles adhering to the induction passage wall.

Additionally, the relatively large volume provided by the disclosed auxiliary intake passage configuration reduces intake fluid flow interference to each combustion chamber. Engine responsiveness is also improved since the configuration of the intake passage system makes it possible for a very large amount of mixture to be stored which is immediately available in case of sudden variations of engine load. Furthermore, the step interfacing the first portion and the second portion causes any fuel which adheres to the wall of said first portion to be torn away; thus largely preventing liquid fuel drops from running down the walls of the intake passage, and minimizing uneven variations in air-fuel ratio, whereby a homogeneous mixture of air and fuel is formed and distribution of said mixture is improved.

Other and more detailed objects and advantages will appear hereinafter:

Figure 1:
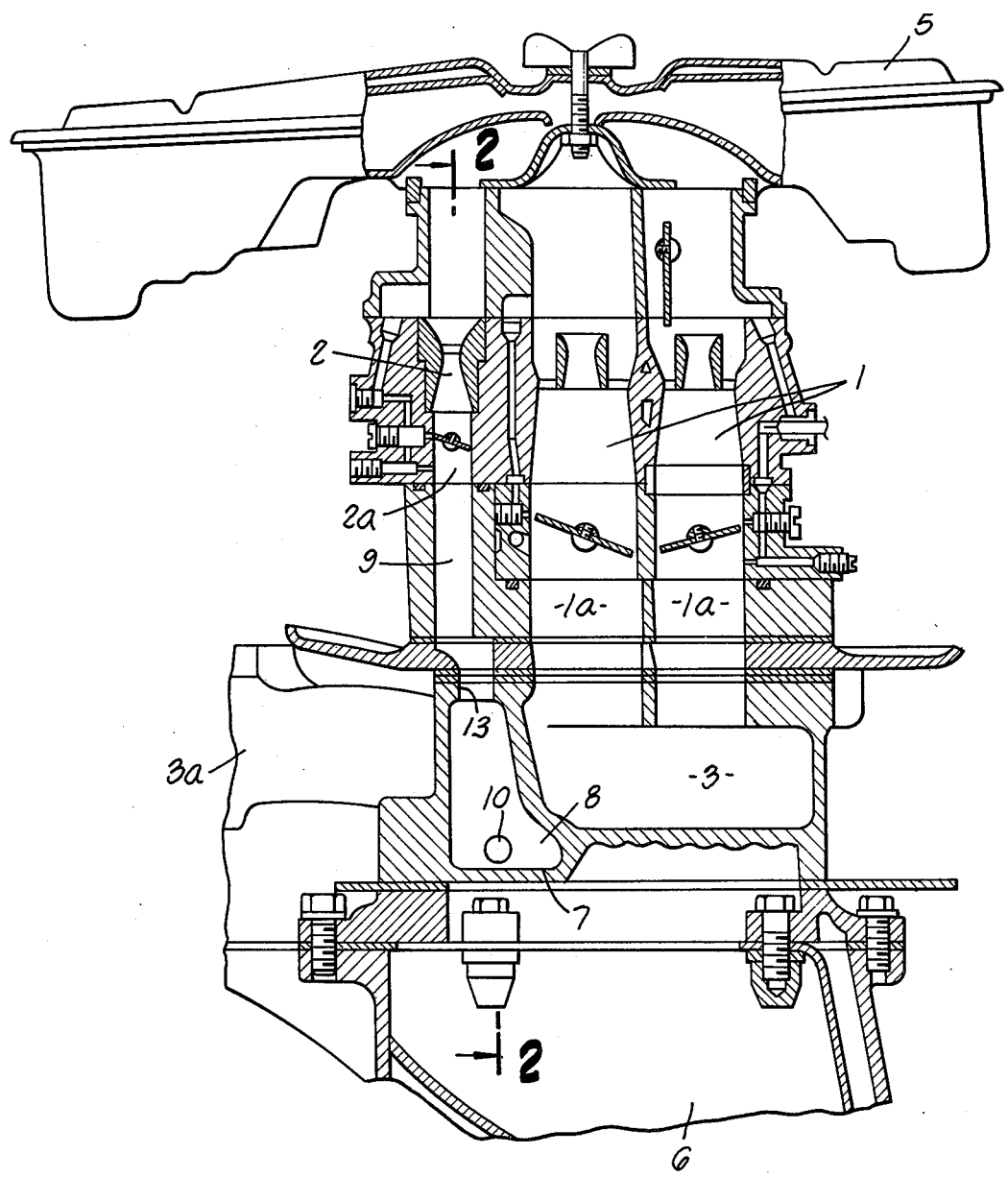
FIG. 1 is a sectional side view showing a preferred embodiment of this invention including the auxiliary and main carburetor assemblies.

Referring to the drawings, the preferred embodiment of FIG. 1 shows the carburetor assembly for a spark ignition, stratified charge internal combustion engine. Main carburetors 1 of the parallel-downdraft type provide a lean mixture to main combustion chambers of the engine (not shown) through main carburetor passages 1a, main intake passage 3 and intake manifold 3a. Air cleaner 5 is placed at the upstream end of said carburetor passages 1a.

An auxiliary carburetor 2 is positioned parallel to main carburetors 1 and provides a rich mixture to auxiliary combustion chambers (not shown) through an auxiliary intake passage system which includes induction passage 9, auxiliary intake distribution chamber 8 and branch passages 10.

The auxiliary intake distribution chamber 8 is generally defined as that zone bounded on its lower end by heating surface 7, circumferentially by surface C and on its upper end by a plane substantially coincident with the upper portion of the opening of each branch passage 10. Heat is supplied to heating surface 7 by the passage of exhaust gases in exhaust passage 6 directly below. Auxiliary intake distribution chamber 8 is connected to the carburetor passage 2a by induction passage 9. A plurality of branch passages 10 extend from said distribution chamber 8 to the auxiliary combustion chambers of the engine (not shown).

Figure 2:
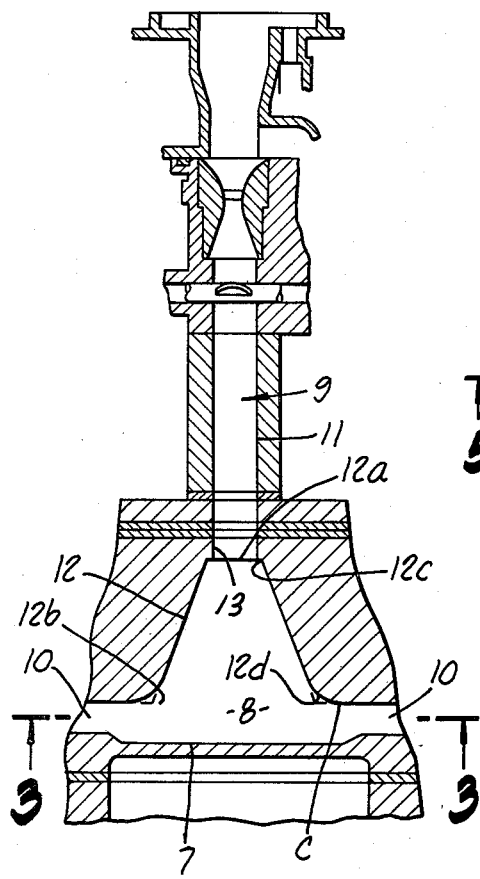
FIG. 2 is a view showing a section taken along lines 2—2 of FIG. 1.

Induction passage 9 is comprised of a first portion 11 of substantially constant cross-sectional area, a flow alignment passage forming a second portion 13 of substantially constant cross-sectional area, and a tapered portion 12 having its cross-sectional area gradually increasing toward the distribution chamber 8. Tapered portion 12 is formed so that its internal wall is outside the axial projection of the internal wall of the second portion 13. As shown in FIG. 2, the passage cross-sectional area of tapered portion 12 increases from its upper end opening 12a to its lower end opening 12b at a rate such that an additional 5-18 square millimeters are present for each 1 millimeter increase in axial length.

The upper end opening 12a defines the interface between the tapered portion 12 and second portion 13, while the lower end opening 12b communicating with auxiliary intake distribution chamber 8 forms a plane substantially coincident with the upper portion of the opening of each branch passage 10 within auxiliary intake distribution chamber 8. It is noted that the upper end opening 12a is provided with a step on its periphery 12c and said lower end opening 12b is provided as necessary with a rounded periphery 12d for purposes of reducing passage flow resistance.

Figure 4:
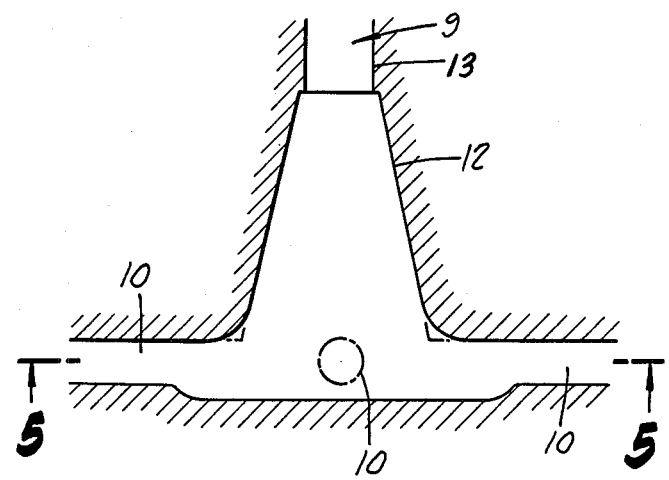
FIG. 4 is a sectional diagram showing a modification.
Figure 5:
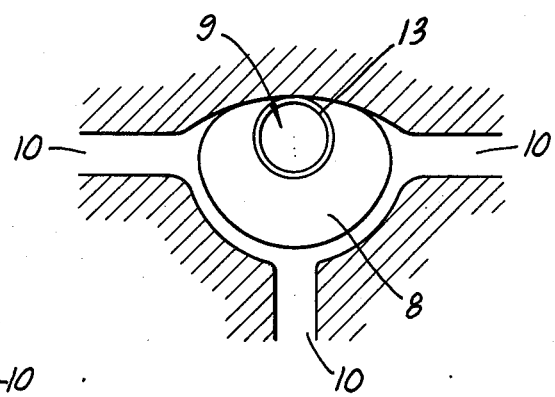
FIG. 5 is a diagram showing a section taken along lines 5—5 of FIG. 4.
Figure 3:
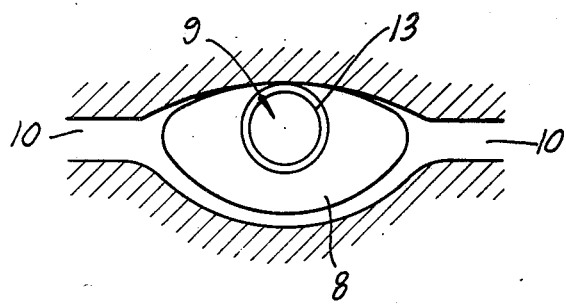
FIG. 3 is a diagram showing a section taken along lines 3—3 of FIG. 2.

The manner in which the auxiliary intake passage cross-sectional area varies is illustrated by FIGS. 3 and 5. FIGS. 2 and 3 show a configuration having two branch passages while FIGS. 4 and 5 show a configuration having three.

Having fully described our invention, it is to be understood that we are not to be limited to the details herein set forth, but that our invention is of the full scope of the appended claims.

We claim:

1. For use with an internal combustion, spark ignition engine having a main carburetor to provide the engine with a lean mixture and an auxiliary carburetor to provide the engine with a rich mixture, an auxiliary intake passage system comprising, in combination: an auxiliary intake distribution chamber having a bottom wall heating surface, branch passage means extending from said chamber, an induction passage connecting said auxiliary carburetor to said chamber, said induction passage having a flow alignment passage with an internal surface of substantially constant cross-sectional area and having a tapered portion receiving flow of mixture from said flow alignment passage, said tapered portion being tapered to enlarge in the direction of flow, said tapered portion having an internal wall outside a projection of the internal surface of said flow alignment passage; and said auxiliary intake distribution chamber heating surface having a depressed portion of substantially uniform depth positioned opposite said tapered portion, the cross sectional area of said heating surface depressed portion being larger than the maximum cross sectional area of said tapered portion.

2. The combination set forth in claim 1 in which said tapered portion is formed so that its cross-sectional area as compared to its length increases by 5–18 square millimeters for each 1 millimeter of axial length.

3. The combination set forth in claim 1 in which said branch passage means includes two branch passages for a four-cylinder engine.

4. The combination set forth in claim 1 in which said branch passage means includes three branch passages for a six-cylinder engine.

5. The combination set forth in claim 1 in which said flow alignment passage terminates at an end surface which extends substantially radially outwardly therefrom to join with said tapered portion forming a step shoulder between said flow alignment passage and said tapered portion.

6. For use with an internal combustion, spark ignition engine having a main carburetor to provide the engine with a lean mixture and an auxiliary carburetor to provide the engine with a rich mixture, an auxiliary intake passage system to conduct a flow of rich mixture from the auxiliary carburetor to the engine for combustion comprising, in combination:

an auxiliary intake distribution chamber having a heating surface;
branch passage means extending from said chamber;
an induction passage connecting said auxiliary carburetor to said chamber, said induction passage having a flow alignment passage and a tapered portion, said flow alignment passage having a substantially constant cross-sectional area and being oriented to direct flow towards said heating surface, said tapered portion being in communication with said flow alignment passage to receive flow therefrom and being in communication with said auxiliary intake distribution chamber to direct flow thereto, said tapered portion being tapered outwardly toward said branch passage means and having an end surface extending substantially radially outwardly from said flow alignment passage and an interior peripheral surface extending from said end surface to said auxiliary intake distribution chamber such that an axial projection of said flow alignment passage does not intersect said interior peripheral surface; and
said auxiliary intake distribution chamber heating surface having a depressed portion of substantially uniform depth positioned opposite said tapered portion, the cross sectional area of said heating surface depressed portion being larger than the maximum cross sectional area of said tapered portion.

* * * * *